(12) United States Patent
Kahen

(10) Patent No.: US 7,448,421 B2
(45) Date of Patent: Nov. 11, 2008

(54) SAFETY TRACTION DEVICE

(76) Inventor: Soleyman Kahen, 2215 Turnbridge Ct., Los Angeles, CA (US) 90077

( * ) Notice: Subject to any disclaimer, the term of this patent is extended or adjusted under 35 U.S.C. 154(b) by 47 days.

(21) Appl. No.: 11/129,279

(22) Filed: May 13, 2005

(65) Prior Publication Data

US 2006/0096683 A1 May 11, 2006

Related U.S. Application Data

(63) Continuation-in-part of application No. 10/701,267, filed on Nov. 4, 2003, now Pat. No. 7,174,935.

(51) Int. Cl.
*B60C 11/00* (2006.01)
*B60C 27/00* (2006.01)

(52) U.S. Cl. ................. 152/216; 152/226
(58) Field of Classification Search .......... 152/167, 152/185, 213 R, 216, 225 R, 226–230
See application file for complete search history.

(56) References Cited

U.S. PATENT DOCUMENTS

| | | | |
|---|---|---|---|
| 1,256,160 A | 2/1918 | Parish |
| 1,257,145 A | 2/1918 | Stern |
| 1,787,608 A | 1/1931 | Ansell |
| 2,044,812 A | 6/1936 | Roessel |
| 2,094,425 A | 9/1937 | Cook |
| 2,221,076 A | 11/1940 | Connolly |
| 2,452,688 A | 11/1948 | Schlett |
| 2,494,850 A | 1/1950 | Williams |
| 2,625,441 A | 1/1953 | De Ragon |
| 2,720,237 A | 10/1955 | Chamberlain |
| 2,730,406 A | 1/1956 | Fitzgerald |
| 2,754,874 A | 7/1956 | Gardner |
| 2,770,280 A | 11/1956 | Fries |
| 2,897,868 A | 8/1959 | Putt |
| 2,947,336 A | 8/1960 | Gutierrez |
| 2,948,319 A | 8/1960 | Cannella |
| 3,016,078 A | 1/1962 | Schmidt |
| 3,049,163 A | 8/1962 | Ryan |
| 3,053,302 A | 9/1962 | Bopst |
| 3,071,173 A | 1/1963 | Hoffman |
| 3,089,528 A | 5/1963 | Aler |
| 3,190,335 A | 6/1965 | Isaacman |
| 3,249,143 A | 5/1966 | Scott |
| 3,356,171 A | 12/1967 | Cichetti |

(Continued)

*Primary Examiner*—Jason R Bellinger
(74) *Attorney, Agent, or Firm*—Lauson & Schewe LLP; Robert J. Lauson

(57) ABSTRACT

A wheel hub assembly having a rim, an outer cap and an inner body joined to the cap within the rim and carrying automatically extendable and retractable curved traction elements. The traction elements are curved pieces with inner end portions disposed on the inside of the tire when retracted and outer ends substantially concealed in gaps between the rim and the cap when retracted, and extendable into active positions overlying the tread of the tire by electric motors each driving two rack-and-pinion drives through T-drives between two traction elements. Channel-shaped tracks and guide rollers on the hub base support the fraction elements, which have traction-enhancing ribs and studs on their outer end portions. An alternative embodiment has a hollow annular hub body on which the traction elements are mounted and guided, in two circular slots, with the motors inside the annular body, the body being supported on a framework to be bolted to the central hub element of a conventional wheel.

34 Claims, 5 Drawing Sheets

U.S. PATENT DOCUMENTS

| | | |
|---|---|---|
| 3,422,870 A | 1/1969 | Thomas |
| 3,458,236 A | 7/1969 | Winsen |
| 3,482,617 A | 12/1969 | Putt et al. |
| 3,547,176 A | 12/1970 | Kroken et al. |
| 3,736,970 A | 6/1973 | Clark |
| 3,847,196 A | 11/1974 | Gomez |
| 3,861,752 A | 1/1975 | Thurre et al. |
| 3,995,909 A | 12/1976 | van der Lely |
| 4,024,900 A | 5/1977 | Thomas |
| 4,089,359 A | 5/1978 | Jones |
| 4,098,314 A | 7/1978 | Welsh |
| 4,122,880 A | 10/1978 | Hyggen |
| 4,180,115 A | 12/1979 | Yamagishi |
| 4,209,049 A | 6/1980 | Regensburger |
| 4,228,838 A | 10/1980 | Zerlauth |
| 4,287,926 A | 9/1981 | Wong |
| 4,355,451 A | 10/1982 | Thomas |
| 4,576,214 A | 3/1986 | Pruesker |
| 4,603,916 A | 8/1986 | Granryo |
| 4,643,251 A | 2/1987 | Ziccardi et al. |
| 4,694,872 A | 9/1987 | Granryo |
| 4,735,248 A | 4/1988 | Cizaire |
| 4,747,438 A | 5/1988 | Joung |
| 4,883,104 A | 11/1989 | Minami |
| 4,903,746 A | 2/1990 | Pruesker et al. |
| 4,906,051 A | 3/1990 | Vilhauer, Jr. |
| 4,909,576 A | 3/1990 | Zampieri |
| 5,012,848 A | 5/1991 | Metraux |
| 5,070,923 A | 12/1991 | Tanaka |
| 5,147,479 A | 9/1992 | Koshi et al. |
| 5,156,695 A | 10/1992 | Martin |
| 5,540,267 A | 7/1996 | Rona |
| 5,645,659 A | 7/1997 | Ivan |
| 5,735,980 A | 4/1998 | Robeson |
| 6,053,227 A | 4/2000 | Robeson |
| 6,561,320 B2 | 5/2003 | Yi |
| 6,860,346 B2 | 3/2005 | Burt et al. |
| 7,055,567 B1 | 6/2006 | Della Camera |

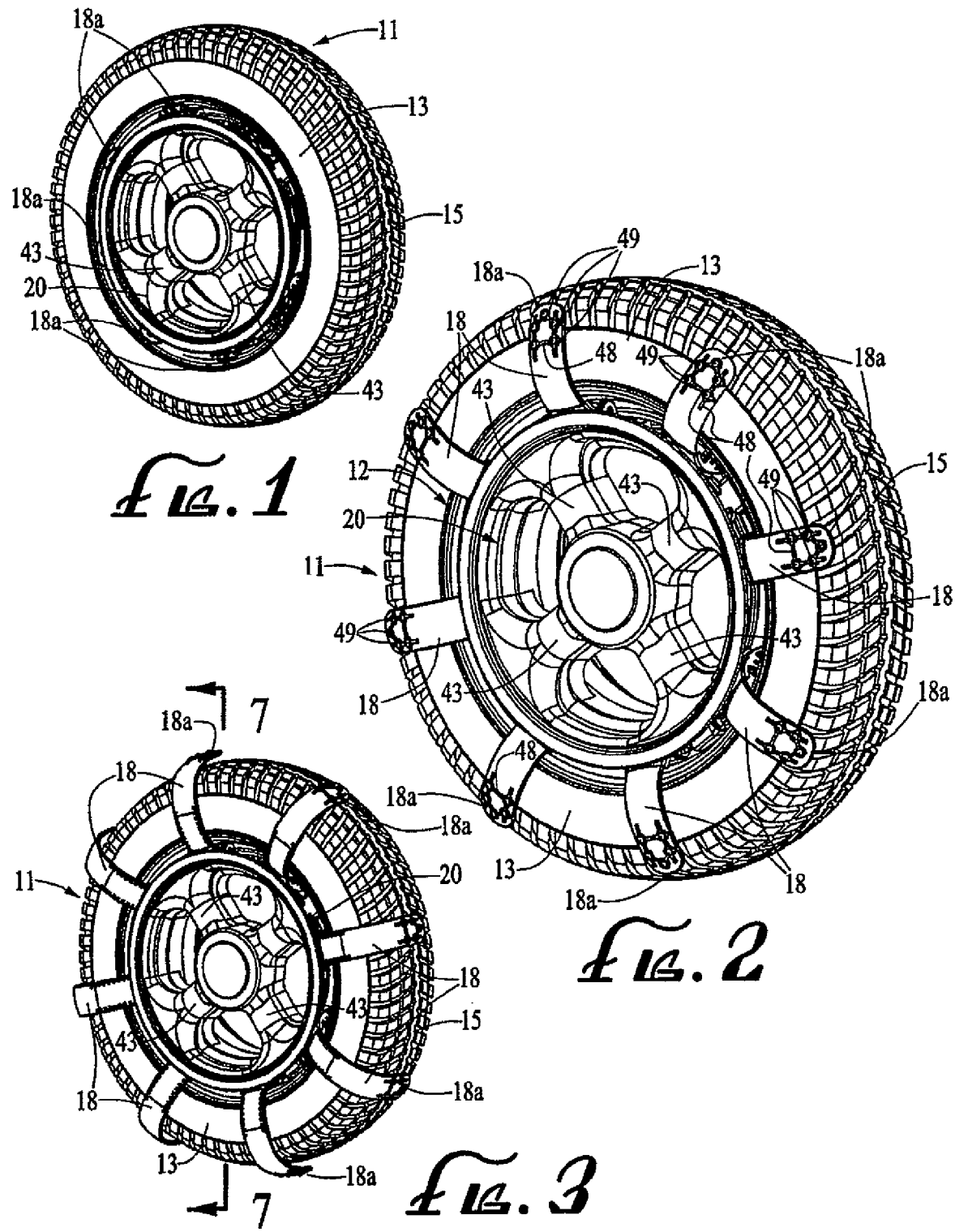

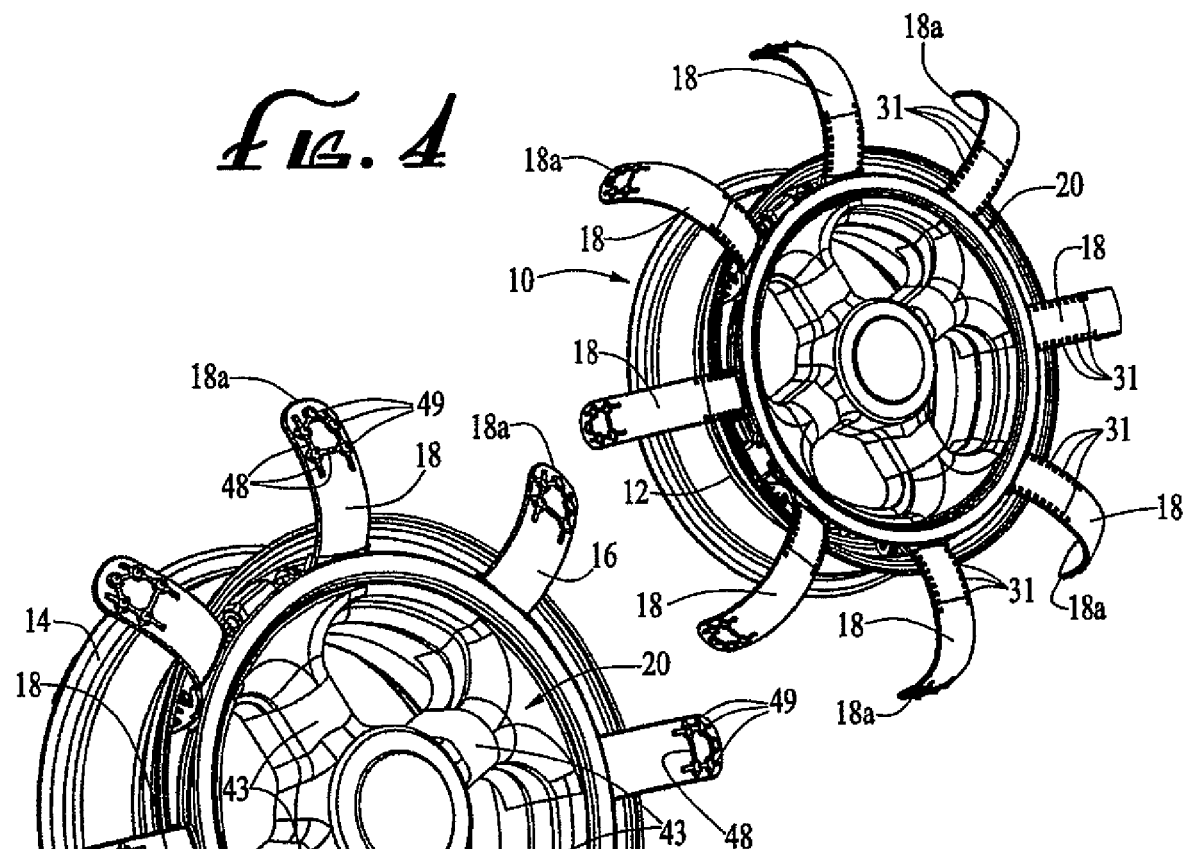
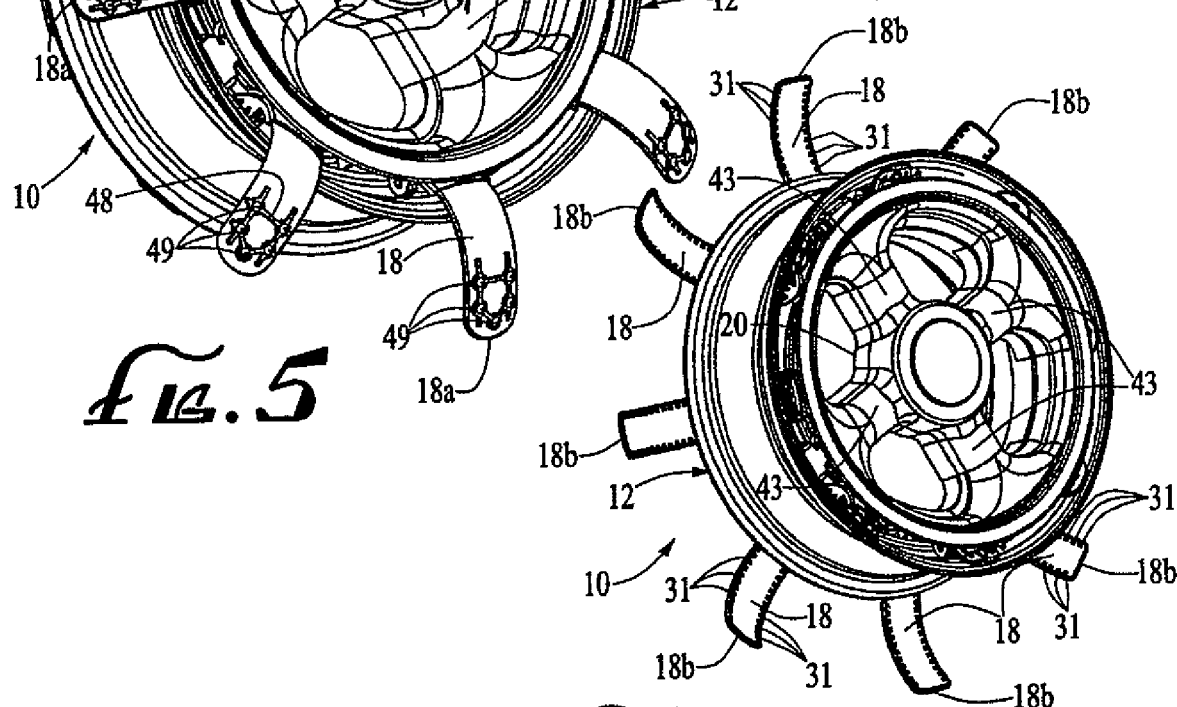

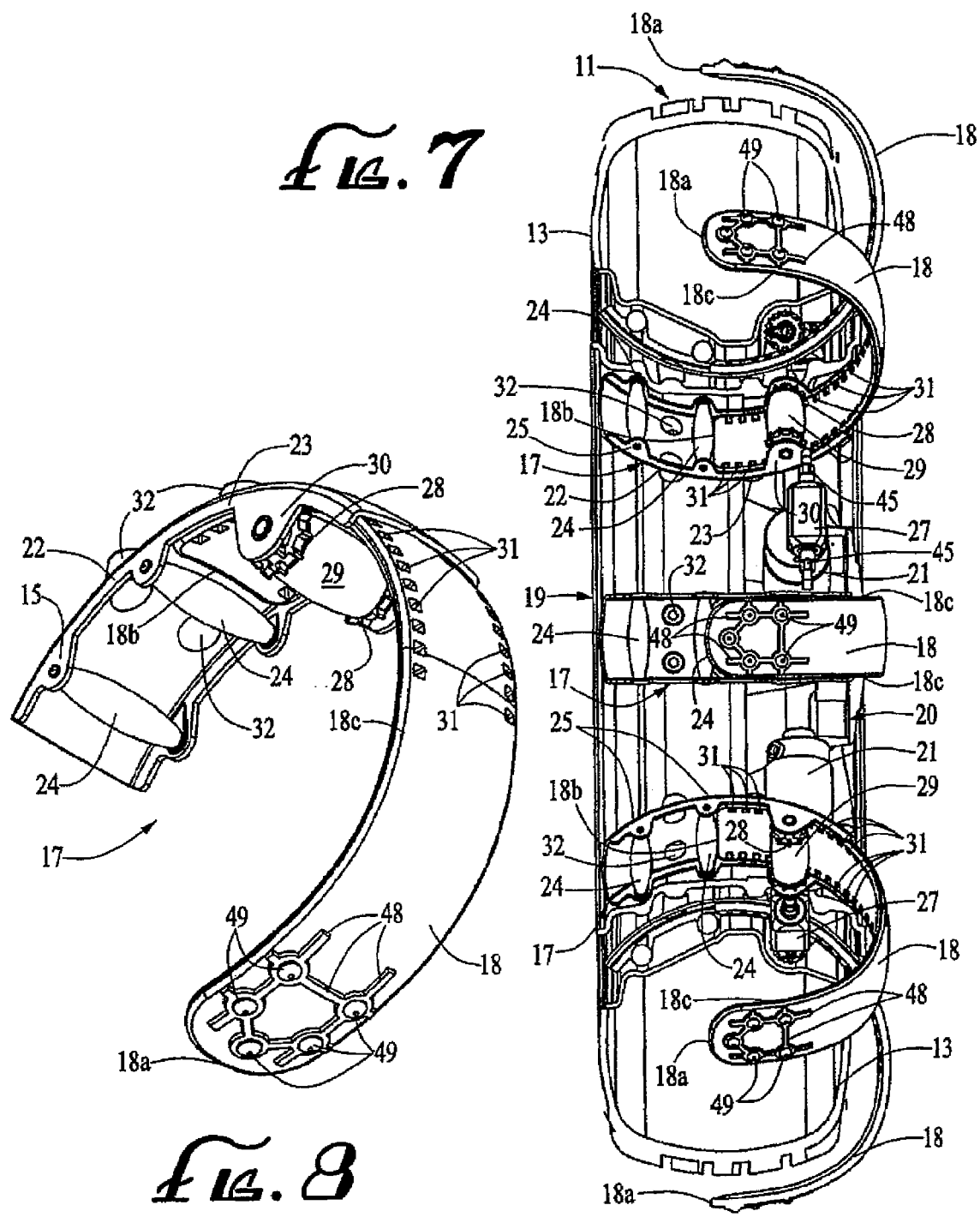

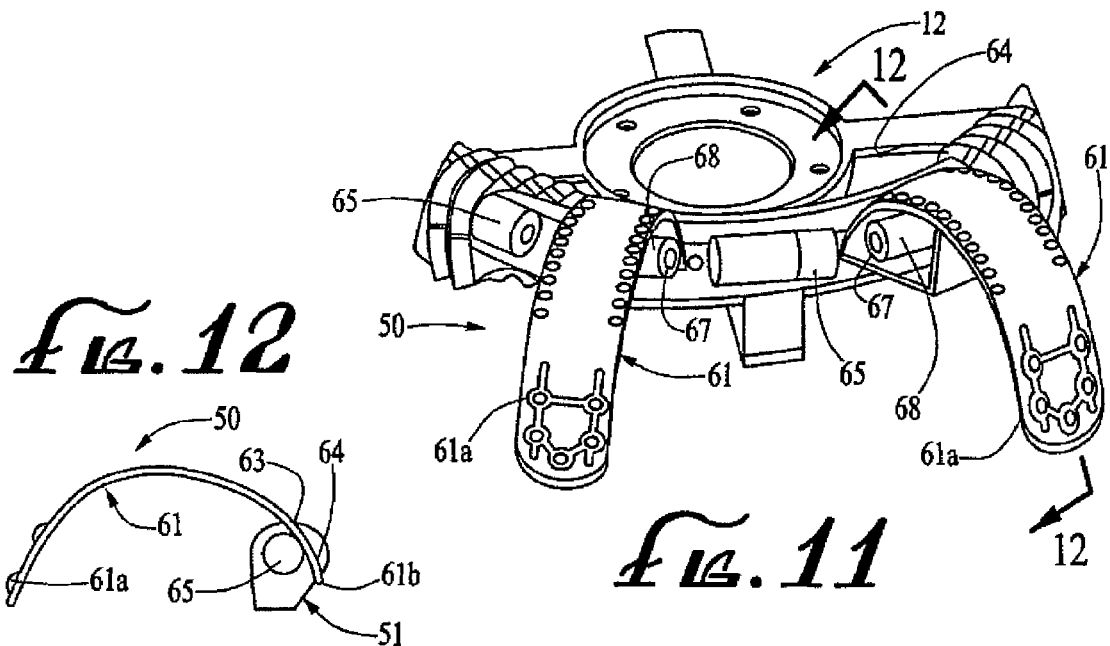
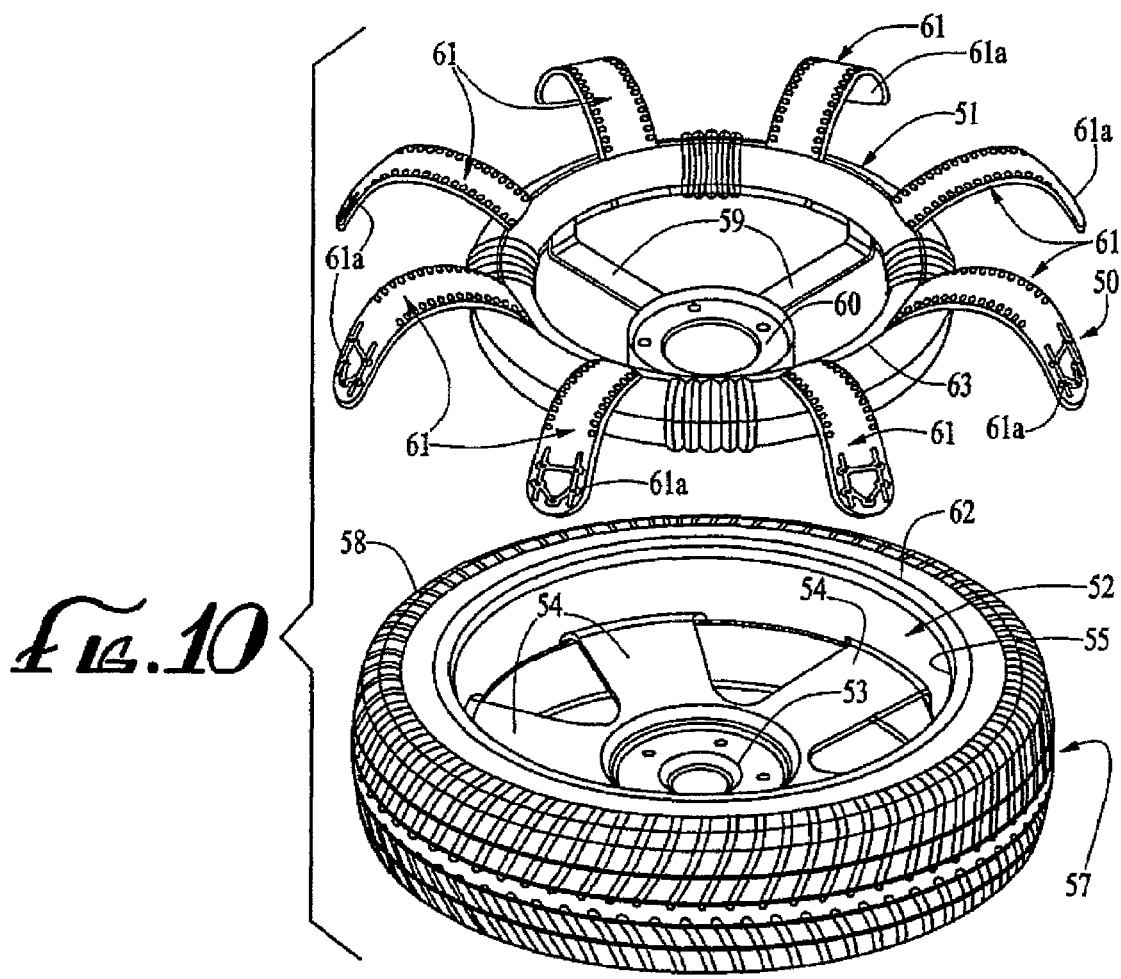

SAFETY TRACTION DEVICE

CROSS REFERENCE TO RELATED APPLICATION

This is a continuation-in-part of, and claims priority from, U.S. application Ser. No. 10/701,267, filed Nov. 4, 2003, now U.S. Pat. No. 7,174,935, entitled "Automatic Safety Tire Device."

BACKGROUND OF THE INVENTION

This invention relates to an automatic device for converting conventional vehicle tires into safety tires having special traction elements added to the conventional tires when increased traction is needed for snow, ice, or other slippery conditions.

It has long been known that vehicle tires with conventional tire treads designed for relatively smooth roads often do not provide adequate traction for snow, ice or other slippery conditions. Accordingly, it is customary for persons who will be driving in locations and at times where such conditions may be encountered either to equip their vehicles with so-called "snow tires" having special deep treads for better traction or to carry with them so-called "snow chains" to be mounted on the tires when the slippery conditions are encountered. Both snow tires and snow chains typically are used only on the powered wheels of the vehicle. While snow tires are usable on non-slippery surfaces and thus can be conveniently used, where legal, for the entire snow season, chains provide a higher level of traction and are more effective.

Typical snow chains comprise a series of short lengths of flexible and durable material, usually metal but sometimes plastic or the like, spaced around and extending transversely across the tread of the tire, and two mounting strips that are connected to opposite ends of the transverse strips to extend along the sidewalls of the tire and joined together at their ends to secure the chains in place around the tires. Typically, a releasable clip carried on one end of the mounting strip is releasably connected to a link on the other end to secure the chain in place.

Unfortunately, chains can be damaged by driving on "dry" pavement for more than brief periods, and also can damage tires and some road surfaces. Accordingly, chains cannot be left indefinitely on a vehicle during the snow season, but instead typically are carried in the vehicle and installed whenever the need arises and for as long as the need continues. A major disadvantage of such chains, however, is the time and effort required to install them on the tires, particularly when the need arises during a trip so as to require roadside installation. Moreover, such installation cannot be performed quickly or while the vehicle is in motion, so chains cannot be made immediately available in an emergency situation, such as the dangerous situation when a vehicle is driven unexpectedly onto a stretch of ice on the roadway. Every installation of conventional chains requires the user to stop the vehicle, position the chains on the respective wheels of the vehicle, and then connect the ends of the chains before resuming driving. This can be a nasty process in the cold, snowy or slushy conditions that often exist when the need for chains arises.

Efforts have been made to provide snow chains and similar devices that are more easily installed for use. For example, U.S. Pat. No. 5,501,482 discloses a traction device that can be fitted to the side of a wheel and having a number of generally radially extending traction arms formed integrally with a central disc and having free outer end portions that bend around the tire. As with conventional chains, this type of traction device must be installed manually on the wheels when snow conditions are encountered, and does not avoid the shortcomings of other prior devices. While some of these devices appear to be better than conventional snow chains, the need still exists for a safe, effective and reliable tire device that can be automatically installed on, and removed from, vehicle tires so as to be quickly and easily available when needed without the time delay and effort required for conventional snow chains and traction devices.

In addition, there is a need for such an automatic device that can be produced as a special wheel to match existing conventional wheels in external appearance while containing the elements for automatic extension and retraction of traction elements from concealed retracted positions to extended, active positions. This invention provides such a device.

SUMMARY OF THE INVENTION

The present invention resides in a safety traction device that is built into a special vehicle wheel assembly and substantially concealed therein so that the traction-equipped wheel has the same general appearance as the other wheels of the vehicles and in a compact and effective manner that supports guides and actuates the traction elements in a highly effective manner. The traction elements of the device are mounted in a hub assembly that is fitted into a wheel rim, preferably specially shaped to receive the hub assembly, and are guided in the assembly for movement around the rim and the tire from retracted positions in which the traction elements are disposed substantially within the assembly and out of sight, to extended positions in which the free outer end portions of the elements overlie the ground-engaging portion of the tire to provide enhanced traction for the vehicle. The elements are driven selectively between these two positions by power actuators housed in the hub assembly and capable of being actuated by a remote control for on-demand operation.

The preferred safety traction device uses curved traction elements that follow the contour of the tire and the rim during extension and retraction and preferably have traction ridges, studs or both on their free ends, and a hub assembly that comprises an outer generally circular cap with a decorative outside surface disposed over the outer side of the wheel rim and an inner end inside the rim, an inside generally circular base or body with an inside surface disposed over the inner side of the wheel rim and an outer end secured to the outer cap inside the rim, and a selected number of traction assemblies spaced around the hub assembly substantially inside the rim and including roller guides and tracks supporting traction elements for movement along arcuate paths extending from inside the rim to outside the tire and power actuators mounted in the hub assembly to drive the traction elements back and forth along their paths. The preferred power actuators are rotary electric motors disposed between adjacent traction elements and driving dual output shafts extending in opposite directions and coupled to drive gears or sprockets engaging sprocket holes in the traction elements, to form rack-and-pinion drives. In this manner, one power actuator can drive two traction elements simultaneously.

An alternative embodiment mounts a hollow annular body of the hub assembly on the rear of a conventional rim, houses the motors in this body and guides the traction elements in slots in the body. This embodiment is carried on a framework that is bolted to the hub of the wheel.

Additional aspects and advantages of the invention, including specifics of the hub assembly and the traction assemblies, will become apparent from the following detailed description, taken in conjunction with the accompanying drawings.

BRIEF DESCRIPTION OF THE DRAWINGS

FIG. 1 is a side perspective view of a vehicle tire mounted on a wheel assembly incorporating the novel features of the present invention, the traction elements being shown in the retracted positions;

FIG. 2 is a somewhat enlarged perspective view of the tire and wheel assembly of FIG. 1 with the traction elements partially extended;

FIG. 3 is a perspective view similar to FIG. 1 with the traction elements fully extended;

FIG. 4 is a different front perspective view of the wheel assembly (with tire removed) with the traction elements extended.

FIG. 5 is an enlarged front perspective view similar to FIG. 4 with the traction elements partially extended;

FIG. 6 is a front perspective view similar to FIG. 4 with the traction elements retracted;

FIG. 7 is a further enlarged cross-section view taken substantially along line 7-7 of FIG. 3, with parts shown in side elevation for clarity;

FIG. 8 is a further enlarged perspective view of a traction element and its guiding supports and track shown in the extended condition.

FIG. 10 is an exploded perspective view of an alternative embodiment of the invention, with a conventional wheel and tire;

FIG. 11 is a side perspective thereof, with portions of the sidewall of the hub body broken away for clarity of illustration; and FIG. 12 is a schematic cross-sectional view taken substantially along line 12-12 of FIG. 11.

DETAILED DESCRIPTION

Figure 9:
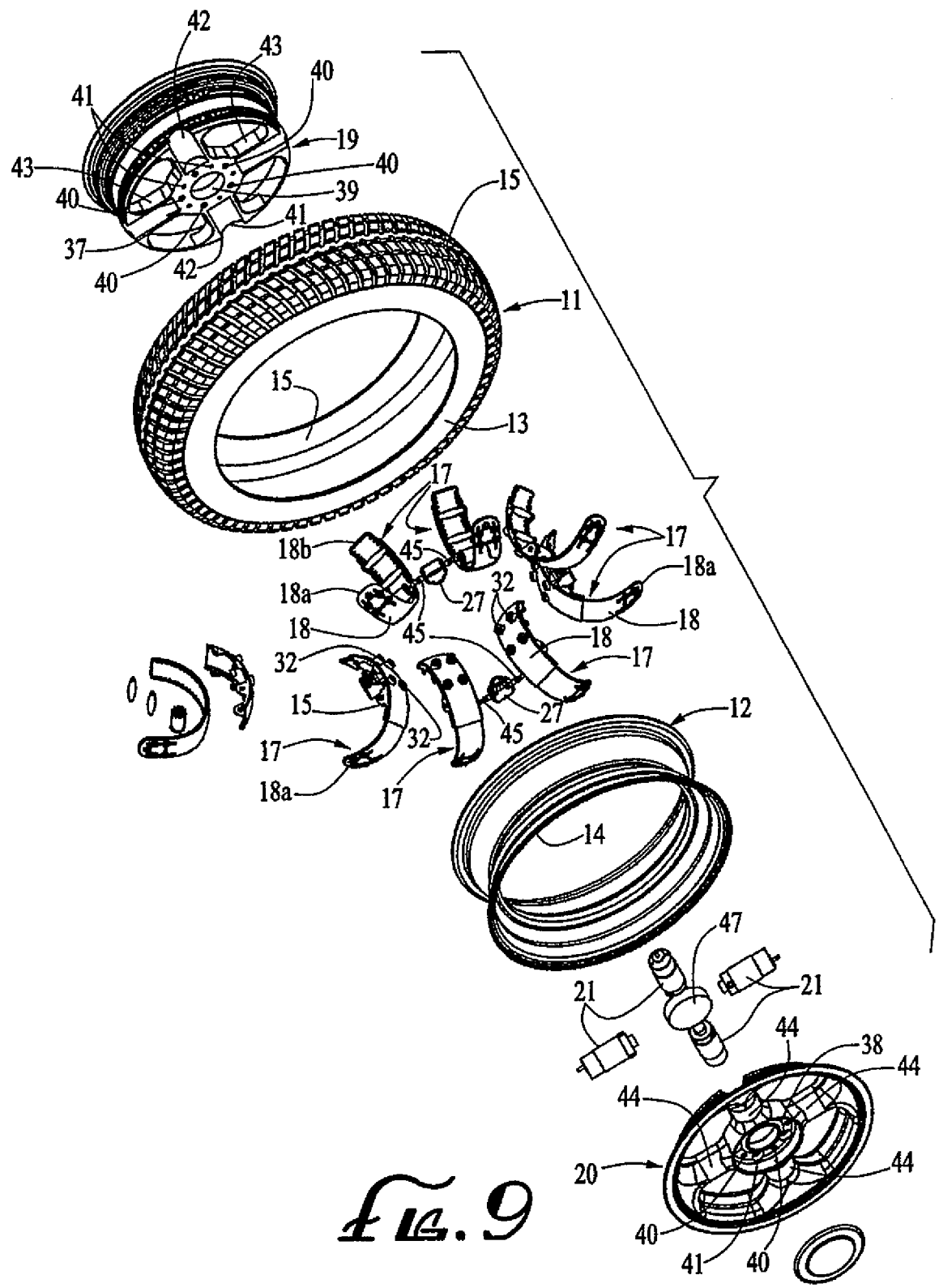
FIG. 9 is an exploded perspective view of the basic parts of the invention.

As shown in the drawings for purposes of illustration, the invention is embodied in a safety traction assembly, indicated generally by the reference number 10, for use with a tire 11 that is mounted on an annular wheel rim 12 having a generally curved radially inner contour, the tire having laterally spaced inner and outer sidewalls 13 that seal against flanges 14 of the rim to hold air in the tire in use. The tire has a conventional tread area 15 for engaging the ground or a roadway or other surface, to support a vehicle such as a car or truck (not shown), as generally described in the prior co-pending patent application.

In accordance with the present invention, the wheel rim 12 is mounted on a safety traction hub assembly that comprises a plurality of traction assemblies indicated generally at 17 (FIGS. 7, 8 and 9) and including curved traction elements 18, a hub made up of an inner body or base 19 and an outer cap 20, and power actuators 21 mounted in the hub assembly and drivingly coupled to the traction elements 18 to extend and retract them automatically upon demand. The rim 12 is shaped with an inside curvature that accommodates the traction assemblies.

In the preferred embodiment, the traction assemblies 17 include curved, channel-shaped tracks 22 with side guides 23 (FIG. 8) for the edges of the traction elements and roller guides 24 overlying the elements between the side guides 23 and rotatably mounted on tabs 25 on the side guides, and the power actuators 21 are disposed between the inner body 19 and outer cap 20 of the hub assembly and coupled to the traction elements 18 by T-drive elements 27 (FIGS. 7 and 9) that drive double pinion gear sprockets 28 overlying each traction element. The pinion gears are mounted on the ends of spools 29 that are rotatably supported on tabs 30 on the tracks 22, and are rotated in one direction or the other by the T-drive elements 27. The pinion gears on the sprockets mesh with aligned rows of gear holes or slots 31 along both edges of each traction element, forming a double rack-and-pinion drive for each traction element. The guide rollers 24 and the spools 29 are tapered toward their ends from thick central portions which press the traction elements tightly into the tracks 22, for secure sliding support of the inner end portions of the traction elements.

Formed on each track 22 are fastener pads 32, herein four (FIGS. 7, 8 and 9), that are positioned to be aligned with rivet holes 33 (FIG. 9) on the base 19 of the hub assembly and receive rivets (not shown) which join the tracks 22 securely to the base 19. The free end portions of the elements project outwardly from the base, to the right as viewed in FIG. 7, with the outer, or right-hand end of each track adjacent to the outer flange 14 of the rim 12 when the base 19 is in place within the inside portion of the rim, as can be seen in FIG. 7. In this manner, the traction assemblies can be supported entirely on the inner or base portion 19 of the hub assembly.

The cap 20 of the hub assembly is fitted into the front or laterally outer side of the rim 12 and abuts against the rear or laterally inner side of the base 19 in the central portion thereof. As can be best seen in FIG. 9, the base 19 has a central hub 37 with a flat outer side for engaging a similar central flat side on the cap 20, around central holes 38 and 39 for the end of the axle (not shown) of the vehicle. A first set of holes 40 is provided in each hub piece 19, 20 of the hub assembly, to receive the conventional wheel lugs (not shown) of the wheel, five of these being shown in the illustrative wheel. An additional set of smaller holes 41 is provided in the base 19 and the cap 20 and angularly aligned to receive fasteners (not shown) such as bolts for joining these two hub parts together inside the rim 12, so that they act as one piece in the assembled traction device.

As can be seen most clearly in FIG. 7, and in exploded or separated relation in FIG. 9, there is an even number of traction assemblies, eight in this instance, and four power actuators 21 are mounted between the two hub pieces 19 and 20, and herein comprise generally cylindrical, 12-volt rotary electric motors that are disposed in cylindrical cavities defined by complementary half cavities 42 in the adjacent faces of the hub pieces. As seen most clearly in the base 19 in FIG. 9, the illustrative base 19 and cap 20 have four half spokes 43 and 44, respectively, with the half cavities in the adjacent faces of the half spokes.

The radially outer ends of the motor cavities are open and the rotary output shaft of each motor is positioned near the open end, within the rim 12, and coupled to a T-drive 27 which is disposed between two traction assemblies 17, as shown most clearly in FIG. 9. The T-drive in turn, has two output shafts 45 on opposite sides which are coupled to the drive sprockets of the traction assemblies on opposite sides, to extend and retract the traction elements 18 as the driving motor shaft turns in one direction or the other. A power source 47, in the form of a suitable generator or battery, is provided in each hub assembly for powering the motors reversibly under the control of a remote control system (not shown).

For optimum performance, the traction elements 18 have a preselected curvature that is generally arcuate to follow the cross-sectional contour of the tire, as best seen in FIG. 7, and may be almost straight near their free ends $18^a$ to overlie the tread 15 and be pressed flat against it by the ground, in operation. The inner end portion $18^b$ is shaped to lie against the inner side of the tire when retracted (FIG. 6) and to lie inside the rim when extended (FIG. 7).

The preferred traction element is molded of a hard, but somewhat resiliently flexible, material such as rubber or high-impact plastic such as polystyrene, in the form of a curved strap with a width that fits closely between the guides 23 of the track, and thick enough to be strong and durable in use. Reinforced edges 18$^c$ are preferred for increased durability, and the free end portions are provided with traction-enhancing abutments 48 and 49, herein a grid-work pattern of raised ribs 48 and metal studs 49 set into the traction element. As can be seen in FIG. 7, these elements are disposed over the mid portion of the tread 15 of the tire 11 when the traction elements 18 are extended.

The safety traction assembly 10 of the present invention can be designed with a hub assembly that matches the design of the standard wheels of the vehicle, such as the four-spoked configuration shown herein, or custom wheels can be provided for use with the design of the special hub assemblies of the invention, so the safety traction devices do not detract from the appearance of the vehicle. Of course, on all-wheel drive vehicles, all of the wheels may be equipped with safety traction devices.

In normal operation, the traction elements 18 are retracted, as shown in FIGS. 1 and 6, and all that is visible from the outer side of the wheel is a set of angularly spaced gaps in which the outer ends 18$^a$ of the elements are disposed. Preferably, a flexible seal ring (not shown) is provided to close the space between the cap 20 and the rim 12 in the segments of this space between the gaps.

When added traction is needed on the vehicle, the motors 21 are energized by the power source 47, as controlled remotely by the vehicle operator or by an automatic slippage sensor (not shown), to extend the elements 18 through the partially extended positions (FIGS. 2 and 5) into the fully extended positions (FIGS. 3 and 4). The motor control should be of a type that senses resistance, stops the motor momentarily (such as 0.5 of a second), and then reactivates the motor to retry. In this manner, the device 10 is adapted for operation while the vehicle is moving, for optimum response and effectiveness, and accommodates momentary interference with extension of the elements when they are in the ground-engaging portion of the tire's rotation.

Then, when enhanced traction no longer is needed, the motors 21 are actuated in reverse to pull the elements 18 back into the retracted positions shown in FIGS. 1 and 6, in which the outer ends 18$^a$ are disposed between the edge 14 of the rim 12 and the periphery of the cap 20 and the inner end portions 18$^b$ This is the out-of-the-way storage position for the traction elements, ready for immediate use.

An alternative embodiment of the invention is shown in FIGS. 10, 11 and 12, in which a safety traction device 50 comprises an annular hub body 51 that is disposed against the inner side of the rim 52 of a conventional wheel having a central hub element 53 for mounting the wheel on the axle (not shown) of a vehicle. The hub element 53 supports the rim on spokes 54 and has peripheral flanges 55 that engage and seal against a conventional tire 57 having a tread area 58. The hub body 51 has a supporting framework of spaced spokes 59 with ends bent at about ninety degrees to mount the body on the spokes 59, on a central hub element 60 for lying against and to be bolted to the hub element 53.

In this instance, the hub body 51 fits snugly within the flange 55 on the inner side of the wheel rim 52, and supports a plurality of curved safety traction elements 61 in angularly spaced positions around the hub body to project, when extended (FIG. 10), transversely of the body and the wheel across the inner sidewall 62 of the tire and over the tread area 58 of the tire. When contracted, the traction elements are withdrawn through the hub body 51 and into the central portion of the wheel hub. As can be seen in FIGS. 10 and 11, the traction elements 61 are substantially the same as in the first embodiment and will not be described in further detail. The annular hub body 51, however, is a hollow ring of suitable material such as relatively hard rubber and has two circular slots 63 and 64 through which opposite end portions of each traction element project (see FIG. 12). One slot 63 is in the exposed side of the body seen in FIG. 10 and positioned to guide the outer end portions 61a of the curved traction elements along the inner wall 62 of the tire, and the other slot 64 is spaced around the body and positioned to guide the inner end portions 61b into the central portion of the hub 52. Four flexible and compressible "bellows" sections of the body 51 facilitate fitting of the body snugly into the rim 52.

The automatic operation of the traction elements 61 is effected by reversible rotary electric motors 65 that are housed in the hollow annular body 51, each one being disposed between two adjacent traction elements and having two output shafts at opposite ends of a central housing, each powering a drive sprocket for a traction element. As before, the preferred drive sprocket has two pinion gears 67 at the opposite ends of a spool 68 that presses the traction element 61 slidably against its guides, the edges of the slots 63 and 64 opposite the drive sprocket. This provides sliding support and guiding similar to that provided by the track and rollers of the first embodiment.

Accordingly, the safety traction device 50 can be mounted on the side of a wheel hub and bolted in place by the framework 59, 60 with the traction elements 61 positioned for use upon demand. Actuation and control of the motors 65 is accomplished in the same manner as in the first embodiment.

From the foregoing, it will be seen that the present invention provides a novel automatic safety traction device 10 that is compactly and inconspicuously mounted in a vehicle wheel and is effective upon demand to extend and retract traction elements into and out of operative positions for enhancing the traction of the wheel. It also will be evident that, while a preferred embodiment of the invention has been illustrated and described in detail, various modifications and changes may be made by those skilled in the art without departing from the invention.

I claim as my invention:

1. A safety traction device for use with a vehicle tire having laterally spaced inner and outer sidewalls and a tread area for engaging the ground or a roadway, comprising:

an annular rim for supporting the vehicle tire and having a generally curved radially inner contour;

a hub assembly disposed coaxially within the rim and having laterally spaced inner and outer sides, said hub assembly comprising a hub body forming the inner side of the hub assembly and a cap forming the outer side of the hub assembly, said body and said cap each having abutting central hubs to be secured together within said rim and said rim and said cap defining gaps therebetween on the radially outer side of the hub assembly;

a plurality of traction assemblies angularly spaced around the inner contour of said rim and mounted on said body, each of said traction assemblies having a curved traction element having one end portion mounted on said body to lie alongside the inner sidewall of the tire in a retracted position and an outer end disposed in one of the gaps between said cap and said rim;

a track secured to said body and supporting said traction element slidably thereon, and rollers holding the traction element slidably in the track for movement from the retracted position into an extended position in which said outer end overlies the tread area and said one end portion is secured in said track within the rim; and power actuators for said traction assemblies comprising reversible motors housed in said hub assembly and drivingly coupled to said traction assemblies to move said traction elements back and forth between said retracted and extended positions on demand.

2. A safety traction device as defined in claim 1, wherein said hub body and said cap have spoke halves that abut to form spokes for said rim, and said power actuators are housed in said spokes.

3. A safety traction device as defined in claim 1, wherein each of said tracks is channel-shaped and curved to follow the contour of said rim, and said rollers are rotatably mounted between the sides of the channel-shaped track.

4. A safety traction device as defined in claim 1, wherein there is an even number of said traction assemblies and a power actuator is disposed between adjacent traction assemblies and drivingly coupled thereto by a T-drive that drives both traction assemblies in unison.

5. A safety traction device as defined in claim 4, wherein said T-drives are coupled to double-drive sprockets, each having a central spool guiding the traction element and two pinion gears spaced apart across the traction element, said traction element having two spaced rows of drive holes engageable with said pinion gears of said double-drive sprocket to extend and retract the drive element.

6. A safety traction device as defined in claim 4, wherein each of said power actuators is housed in a cavity defined in a spoke of the hub assembly.

7. A safety traction device as defined in claim 1, wherein said traction elements comprise molded pieces of impact resistant and resiliently flexible material.

8. A safety traction device as defined in claim 7, wherein said traction elements are composed of a material selected from the group comprising rubber and polystyrene.

9. A safety traction device as defined in claim 1, wherein said traction elements have traction-enhancing ribs and studs on the outer end portions thereof.

10. A safety traction device as defined in claim 1, wherein said power actuators are reversible rotary electric motors.

11. A safety traction device as defined in claim 10, wherein there is an even number of said motors, and each is drivingly coupled to two of said traction assemblies to extend and retract the traction elements thereof in unison.

12. A safety traction device for use with a vehicle tire having laterally spaced inner and outer sides and an area for engaging the ground or a roadway and an annular rim having laterally spaced inner and outer sides and a outer flange for supporting the tire, comprising:

a hub assembly for mounting the tire on a vehicle and comprising a hub body for coaxial insertion into the inner side of the rim and a cap for fitting into the outer side of the rim and abutting against the body to be joined thereto;

a plurality of traction assemblies angularly spaced around the hub assembly and each having a traction element with an outer end spaced from the ground-engaging area of the tire and being positioned within the circumferential boundary defined by said outer flange when the traction element is in the retracted position, said traction elements being movably mounted on said hub assembly for extension of said traction elements to position said outer ends over the ground engaging area of the tire for enhanced traction; and a power actuator drivingly coupled to each of said traction assemblies and operable when actuated to extend said traction elements for enhanced traction and to retract the traction elements to the retracted positions.

13. A safety traction device as defined in claim 12, wherein said traction assemblies include tracks mounted on said hub body and slidably supporting and guiding said traction elements for extension and retraction.

14. A safety traction device as defined in claim 13, wherein said rim has a curved inside contour and said tracks are channel-shaped and curved to follow the inside contour of the rim.

15. A safety traction device as defined in claim 14 further including rollers rotatably mounted on said tracks and holding the traction elements slidably therein.

16. A safety traction device as defined in claim 13, wherein said traction elements are curved to follow the tracks and the contour of the rim and the tire while moving between the extended and retracted positions.

17. A safety traction device as defined in claim 16, wherein said traction elements are composed of relatively stiff and resiliently flexible impact resistant material.

18. A safety traction device as defined in claim 17, wherein the material is selected from the group comprising hard rubber and polystyrene.

19. A safety traction device as defined in claim 12, wherein said hub body and said cap are formed with spoke halves that abut each other to form spokes for the rim.

20. A safety traction device as defined in claim 19, wherein said power actuators are reversible rotary electric motors housed in cavities defined in said spokes.

21. A safety traction device as defined in claim 20, wherein said motors are drivingly connected to said traction elements by rack-and-pinion drives.

22. A safety traction device as defined in claim 20, wherein each of said motors has an output shaft at the radially inner end of a spoke and is drivingly coupled to two of said traction assemblies positioned on opposite sides of the radially outer end of the spoke.

23. A safety traction device as defined in claim 22, wherein said motors are coupled to said traction assemblies by T-drives coupled to said output shafts, and each driving two rack-and-pinion drives for the two traction assemblies.

24. A safety traction device as defined in claim 21, wherein each of said rack-and-pinion drives comprises a sprocket spool with two spaced pinion gears, and two rows of gear holes formed in the traction element.

25. A safety traction device for use with a vehicle wheel having a tire mounted on annular rim with an outer flange and having a ground engaging tread portion, comprising:

a hub assembly to be coaxially mounted within the rim;

a plurality of traction assemblies mounted on said hub assembly and each having an extendable and retractable traction element, an outer end of said traction elements being positioned within the circumferential boundary defined by said outer flange, when retracted, and having end portions for overlying the tread portion, when extended; and a reversible power actuator for each traction assembly for moving the traction elements selectively between extended and retracted positions.

26. A safety traction device as defined in claim 25, wherein each of said elements is mounted to move between a retracted position with said outer end adjacent to the hub assembly and an extended position in which the outer end overlies the tire.

27. A safety traction device for use with a vehicle tire having an area for engaging the ground or a roadway and an annular rim for supporting the tire and having laterally spaced inner and outer sides and a peripheral flange, comprising:

a hub assembly including a hub body for coaxial mounting within said peripheral flange of the inner side of the rim;

a plurality of traction assemblies angularly spaced around the hub assembly and each having a traction element with one end portion guided on the hub body for back and forth movement and an opposite end portion for projecting out of the hub body and movable into and out of extended positions overlying the ground-engaging area of the tire during such back and forth movement, said opposite end portions being retracted into the hub assembly within the circumferential boundary defined by said peripheral flange when in retracted positions;

and reversible power actuators mounted on said hub assembly and drivingly coupled to said traction elements to move said elements automatically into and out of the extended positions.

28. A safety traction device as defined in claim 27 wherein said hub assembly includes a cap secured to the outer side of said hub body, and said power actuators comprise motors housed in recesses defined between said hub body and said cap.

29. A safety traction device as defined in claim 28 further including tracks on said hub body slidably supporting said one end portions of said traction elements on said hub bodies, and roller guides holding said traction elements movably on said tracks, said opposite end portions extending outwardly from said hub body and around the outer side of the tire in said extended portions.

30. A safety traction device as fined in claim 27, wherein said hub assembly comprises a hollow annular hub body fitted against the inside of the rim and including a mounting structure for abutting against the inner side of the wheel, said body having two sets of guide slots slidably supporting said traction elements with said opposite end positions thereof adjacent the inner side of the tire and movable into extended positions overlying the ground-engaging area of the tire.

31. A safety traction device as defined in claim 30 wherein said body is composed of rubber and has flexible and compressible sections for adapting to the size of the rim.

32. A safety traction device s defined in claim 30 wherein said power actuators are housed in said body and are coupled to the traction elements by rack-and-pinion drives in the body.

33. A safety traction device as defined in claim 32 wherein said rack-and-pinion drives comprise at least one pinion gear driven by each power actuator and spaced openings in said traction elements meshing with said pinion gear.

34. A safety traction device as defined in claim 32 wherein said power actuators are rotary electric motors mounted on said hub body, each between two of said traction elements and having two output shafts, each of said shafts being coupled to a drive sprocket carrying two pinion gears meshing with two rows of spaced openings on the traction element, whereby one motor drives two adjacent traction elements.

* * * * *